United States Patent
Kogo

(10) Patent No.: US 8,056,325 B2
(45) Date of Patent: Nov. 15, 2011

(54) EXHAUST GAS PURIFICATION APPARATUS REGENERATION SYSTEM OF INTERNAL COMBUSTION ENGINE

(75) Inventor: Tomoyuki Kogo, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1126 days.

(21) Appl. No.: 11/794,467

(22) PCT Filed: Jan. 16, 2006

(86) PCT No.: PCT/JP2006/000908
§ 371 (c)(1),
(2), (4) Date: Jun. 29, 2007

(87) PCT Pub. No.: WO2006/075802
PCT Pub. Date: Jul. 20, 2006

(65) Prior Publication Data
US 2008/0264044 A1    Oct. 30, 2008

(30) Foreign Application Priority Data
Jan. 14, 2005  (JP) .................................. 2005-008139

(51) Int. Cl.
*F01N 3/00* (2006.01)

(52) U.S. Cl. ................. 60/295; 60/285; 60/274; 60/277
(58) Field of Classification Search ..................... 60/295, 60/285, 274, 277
See application file for complete search history.

(56) References Cited

U.S. PATENT DOCUMENTS

| 6,032,461 A * | 3/2000 | Kinugasa et al. ............... 60/295 |
| 6,424,924 B1 | 7/2002 | Wagner et al. |
| 6,962,046 B2 | 11/2005 | Kuboshima et al. |
| 2002/0078684 A1* | 6/2002 | Carberry et al. ............... 60/295 |

FOREIGN PATENT DOCUMENTS

| JP | A-57-151428 | 9/1982 |
| JP | A 11-229852 | 8/1999 |
| JP | A 2000-54828 | 2/2000 |

(Continued)

OTHER PUBLICATIONS

Mar. 30, 2011 Search Report issued in European Application No. 06712125.1.

*Primary Examiner* — Kenneth Bomberg
*Assistant Examiner* — Michael Carton
(74) *Attorney, Agent, or Firm* — Oliff & Berridge, PLC

(57) ABSTRACT

An object of the present invention is to prevent, in connection with an exhaust gas purification apparatus regeneration system of an internal combustion engine, the possible travel distance of a vehicle after warning by a warning apparatus for warning excessive smallness of the fuel quantity is started from being unduly shortened even if regeneration control is executed while the warning is given by a warning apparatus. The system according to the invention has a warning apparatus that gives warning when the remaining fuel quantity is equal to or smaller than a first specified fuel quantity. When it is predicted that the regeneration control in which fuel is supplied to the exhaust gas purification apparatus will be executed when the remaining fuel quantity is equal to or smaller than the first specified remaining quantity, warning by the warning apparatus is started before the remaining fuel quantity becomes equal to the first specified remaining quantity (S104, S105).

11 Claims, 4 Drawing Sheets

FOREIGN PATENT DOCUMENTS

| | | |
|---|---|---|
| JP | B2 3106502 | 9/2000 |
| JP | A 2003-3829 | 1/2003 |
| JP | A 2003-148132 | 5/2003 |
| JP | A 2004-19524 | 1/2004 |
| JP | 2004285947 A * | 10/2004 |
| JP | A 2004-285947 | 10/2004 |
| WO | WO97/16632 | 5/1997 |
| WO | WO 99/67103 | 12/1999 |

* cited by examiner

EXHAUST GAS PURIFICATION APPARATUS REGENERATION SYSTEM OF INTERNAL COMBUSTION ENGINE

TECHNICAL FIELD

The present invention relates to a regeneration system of an exhaust gas purification apparatus of an internal combustion engine for regenerating the exhaust gas purification ability of the exhaust gas purification apparatus that purifies the exhaust gas discharged from the internal combustion engine by supplying fuel to the exhaust gas purification apparatus.

PRIOR ART

There has been known a technology of providing an exhaust gas purification apparatus in an exhaust passage of an internal combustion engine so as to purify the exhaust gas discharged from the internal combustion engine. Such an exhaust gas purification apparatus includes, for example, a particulate filter (which will be simply referred to as a filter hereinafter) that traps particulate matter (which will be referred to as PM hereinafter) contained in the exhaust gas and an NOx storage reduction catalyst (which will be simply referred to as NOx catalyst hereinafter) that stores NOx contained in the exhaust gas when the ambient atmosphere is oxidizing atmosphere, and reduces NOx stored therein when the ambient atmosphere is reducing atmosphere.

There has also been developed a technology of regenerating the exhaust gas purification ability of such an exhaust gas purification apparatus, when the exhaust gas purification ability thereof is deteriorated, by supplying fuel to the exhaust gas purification apparatus. For example, Japanese Patent Application Laid-Open No. 2003-148132 discloses a technology of supplying fuel to an exhaust gas purification apparatus having an NOx catalyst and filter, upon oxidizing and removing PM deposited in the filter by performing either one or both of exhaust gas fuel addition in which fuel is added into the exhaust gas and sub fuel injection in the internal combustion engine. Japanese Patent Application Laid-Open Nos. 2000-54828 and 2004-19524 also disclose technologies concerning regeneration of the exhaust gas purification ability of an exhaust gas purification apparatus.

DISCLOSURE OF THE INVENTION

Some vehicles with an internal combustion engine are equipped with a warning apparatus that gives a warning about excessive smallness of the fuel quantity when the quantity of the remaining fuel is equal to or smaller than a specified quantity to prevent so-called empty tank or a situation in which the vehicles cannot run any longer by shortage of fuel supply to the internal combustion engine.

As described above, in the case where an exhaust gas purification apparatus such as a filter or a NOx catalyst is provided in an exhaust passage of an internal combustion engine, fuel is sometimes supplied to the exhaust gas purification apparatus so as to regenerate the exhaust gas purification ability of the exhaust gas purification apparatus (such control will be referred to as regeneration control, hereinafter).

If the regeneration control is executed when the remaining fuel quantity is equal to or smaller than a specified remaining quantity and warning is given by the warning apparatus, a part of the fuel is not used to drive the internal combustion engine but supplied to the exhaust gas purification apparatus. Then, there is a possibility that the possible travel distance of the vehicle after the start of warning by the warning apparatus becomes shorter than that in the case of normal running (that is, in the situation where the regeneration control is not being executed).

The present invention has been made in view of the above described problem, and has as an object to provide a technology relating to an exhaust gas purification apparatus regeneration system of an internal combustion engine that enables, even in the case where regeneration control is executed while the warning is given by a warning apparatus for warning excessive smallness of the fuel quantity, to prevent the possible travel distance of a vehicle after the warning is started from being unduly shortened.

The system according to the invention has a warning apparatus that gives warning when the remaining fuel quantity is equal to or smaller than a first specified fuel quantity. When it is predicted that the regeneration control in which fuel is supplied to the exhaust gas purification apparatus will be executed when the remaining fuel quantity is equal to or smaller than the first specified remaining quantity, warning by the warning apparatus is started before the remaining fuel quantity becomes equal to the first specified remaining quantity.

More specifically, the exhaust gas purification apparatus regeneration system of an internal combustion engine according to the present invention is an exhaust gas purification apparatus regeneration system of an internal combustion engine that starts, when a regeneration start condition is satisfied, execution of regeneration control for regenerating the exhaust gas purification ability of an exhaust gas purification apparatus by supplying fuel to the exhaust gas purification apparatus provided in an exhaust passage of the internal combustion engine, comprising:

a warning apparatus for giving warning when a remaining fuel quantity is equal to or smaller than a first specified remaining quantity; and regeneration time prediction device for predicting the time at which said regeneration control will be executed, wherein when it is predicted by said regeneration time prediction device that the regeneration control will be executed when the remaining fuel quantity is equal to or smaller than said first specified remaining quantity, said warning apparatus further gives warning also when the remaining fuel quantity is equal to or smaller than a second specified remaining quantity that is larger than said first specified remaining quantity.

The regeneration start condition may be, for example, that the exhaust gas purification ability of the exhaust gas purification system becomes equal to or lower than a specified level. Alternatively, the regeneration start condition may be that the integrated value of the fuel injection quantity in the internal combustion since the time at which the last filter regeneration control ended becomes equal to or lager than a specified injection quantity, or that the integrated value of the travel distance of the vehicle on which the internal combustion engine is mounted since the time at which the last filter regeneration control ended becomes equal to or longer than a specified distance. The time of execution of the regeneration control can be predicted by predicting the time at which the regeneration start condition is satisfied.

The exhaust gas purification apparatus regeneration system according to the present invention may be, for example, one configured to have a filter, a NOx catalyst or the like. In the case where the exhaust gas purification apparatus is configured to have a filter, it may be determined that the exhaust gas purification ability of the exhaust gas purification apparatus is equal to or lower than the specified level, when the amount of PM deposited in the filter is equal to or larger than a specified deposition amount. In the case where the exhaust gas purification apparatus is configured to have an NOx catalyst, it may be determined that the exhaust gas purification ability of the exhaust gas purification apparatus is equal to or lower than the specified level, when the amount of SOx stored in the NOx catalyst is equal to or larger than a specified storage amount.

According to the present invention, the warning apparatus gives warning when the remaining fuel quantity is equal to or smaller than the first specified remaining quantity. The first specified remaining quantity may be a predetermined fuel quantity that is considered to be the minimum fuel quantity needed to drive the vehicle on which the internal combustion engine is mounted while normal running until the next occasion of refueling the vehicle.

If the regeneration control is executed when the remaining fuel quantity is equal to or smaller than a specified remaining quantity and warning is given by the warning apparatus, a part of the remaining fuel is not used to drive the internal combustion engine but used in the regeneration control. In this case, there is a possibility that the possible travel distance of the vehicle after the start of warning by the warning apparatus becomes shorter than that in the case where the regeneration control is not executed when the remaining fuel quantity is equal to or smaller than the first specified remaining quantity.

In view of this, according to the present invention, when it is predicted by the regeneration time prediction device that the regeneration control will be executed when the remaining fuel quantity is equal to or smaller than the first specified remaining quantity, the warning apparatus further gives warning also when the remaining fuel quantity is equal to or smaller than a second specified remaining quantity that is larger than the first specified remaining quantity. In other words, the time to start warning by the warning apparatus is changed to the time at which the remaining fuel quantity becomes equal to the second specified fuel quantity.

By this feature, even when the regeneration control is executed while warning is given by the warning apparatus, a larger quantity of fuel can be used to drive the internal combustion engine. Therefore, the possible travel distance of the vehicle after warning is started can be prevented from being unduly shortened.

In the case where the system according to the present invention is further provided with regeneration fuel quantity estimation device for estimating a regeneration fuel quantity defined as the quantity of fuel used in the regeneration control, the second specified remaining quantity may be set as the sum of the first specified remaining quantity and the regeneration fuel quantity.

The regeneration fuel quantity estimation device may estimate the regeneration fuel quantity under the assumption that the operation state of the internal combustion engine during execution of the regeneration control is a specific operation state. This specific operation state may be an operation state in which the regeneration fuel quantity becomes the largest. Alternatively, the operation state of the internal combustion engine during execution of the regeneration control may be predicted, and the regeneration fuel quantity may be estimated based on the predicted operation state.

With the above described feature, even when the regeneration control is executed while warning is given by the warning apparatus, the first specified remaining quantity of fuel can be used to drive the internal combustion engine after warning is started. Therefore, the possible travel distance of the vehicle after warning is started can be prevented from being unduly shortened.

In the case where the system according to the present invention is further provided with execution mode setting device for setting execution mode of the regeneration control, the regeneration fuel quantity estimation means device may estimate the regeneration fuel quantity based on the execution mode of the regeneration control set by the execution mode setting device. In this case, the execution mode setting device may set the execution mode of the regeneration control so that the regeneration fuel quantity estimated by the regeneration fuel quantity estimation device becomes equal to or smaller than a predetermined quantity.

The regeneration fuel quantity changes depending on the execution mode of the regeneration control. In other words, the regeneration fuel quantity can be estimated based on the execution mode of the regeneration control.

In the case where the second specified remaining quantity is set as the sum of first specified remaining quantity and the regeneration fuel quantity, there is a possibility that the second specified remaining quantity is too large when the regeneration fuel quantity is large beyond some extent. Consequently, the time at which warning by the warning apparatus is started may be too early in cases where the regeneration control is executed while the remaining fuel quantity is equal to or smaller than the first specified remaining quantity.

In view of this, the execution mode of the regeneration control is set by the execution mode setting device so that the regeneration fuel quantity becomes equal to or smaller than a predetermined quantity, as described above. Here, the predetermined quantity is a quantity equal to or smaller than such a threshold quantity that if, in the case where warning by the warning apparatus is started at the time when the remaining fuel quantity becomes the second specified remaining quantity, the regeneration fuel quantity is larger than that predetermined quantity, it can be determined that the second specified remaining quantity is too large, in other words, that the time at which warning by the warning apparatus is started is too early.

By making the fuel regeneration quantity equal to or smaller than the predetermined quantity, warning by the warning apparatus can be prevented from being started too early in the case where the regeneration control is executed when the remaining fuel quantity is equal to or smaller than the first specified remaining quantity. In other words, the difference between the time at which warning by the warning apparatus is started during normal running and the time at which warning by the warning apparatus is started in the situation where the filter regeneration control is executed when the remaining fuel quantity is equal to or smaller than the first specified remaining quantity can be prevented from becoming unduly large.

According to the present invention, in the case where there is further provided execution mode setting device for setting execution mode of the regeneration control and the regeneration fuel quantity estimation device estimates the regeneration fuel quantity based on the execution mode of the regeneration control set by the execution mode setting device, the execution mode setting device may set the execution mode of the regeneration control so that the second specified remaining quantity set as the sum of the first specified remaining quantity and the regeneration fuel quantity becomes equal to or smaller than the remaining fuel quantity at the time at which it is predicted by the regeneration time prediction device that the regeneration control will be executed when the remaining fuel quantity is equal to or smaller than the first specified remaining quantity.

In the case where the regeneration fuel quantity is estimated at the time at which it is predicted by the regeneration time prediction device that the regeneration control will be executed when the remaining fuel quantity is equal to or smaller than the first specified remaining quantity, if the second specified remaining quantity that is equal to the sum of the first specified remaining quantity and the regeneration fuel quantity is larger than the remaining fuel quantity at that time, warning by the warning apparatus is started at that time. In this case, however, the value obtained by subtracting the regeneration fuel quantity from the remaining fuel quantity at the time of the start of warning is smaller than the value of the first specified remaining quantity. This means that there is a risk that the quantity of fuel that can be used to drive the internal combustion engine after the start of warning by the warning apparatus may become smaller than the first specified remaining quantity.

In view of this, the execution mode of the regeneration control is set so that the second specified remaining quantity becomes equal to or smaller than the remaining fuel quantity at the time at which it is predicted by the regeneration time prediction device that the regeneration control will be executed when the remaining fuel quantity is equal to or smaller than the first specified remaining quantity, as described above.

With this feature, the first specified remaining quantity of fuel can be reserved as fuel that can be used to drive the internal combustion engine after the start of warning by the warning apparatus with higher reliability.

According to the present invention, the regeneration fuel quantity can be changed by changing setting of the time of starting execution of the regeneration control by execution mode setting device. Accordingly, when the regeneration fuel quantity is to be made smaller so as to set the second specified remaining quantity to a desired quantity as described above, the execution mode setting device may change the regeneration start condition as a condition for starting the regeneration control, to thereby set the execution start time of the regeneration control to an earlier time.

By changing the execution start time of the regeneration control to an earlier time, the regeneration control can be executed when the exhaust gas purification apparatus still has higher exhaust gas purification ability. Thus, the execution time of the regeneration control can be shortened, and the regeneration fuel quantity can be made smaller accordingly.

According to the present invention, the regeneration fuel quantity can be changed by changing setting of the time of terminating execution of the regeneration control by the execution mode setting device. Accordingly, when the regeneration fuel quantity is to be made smaller so as to set the second specified remaining quantity to a desired quantity as described above, the execution mode setting device may change the regeneration termination condition as a condition for terminating the regeneration control after execution of the regeneration control has been started, to thereby set the execution termination time of the regeneration control to an earlier time.

By changing the execution termination time of the regeneration control to an earlier time, the execution time of the regeneration control can be shortened, and the regeneration fuel quantity can be made smaller accordingly.

According to the present invention, in the case where the regeneration control is a control to raise the temperature of the exhaust gas purification apparatus to a target temperature by supplying fuel to the exhaust gas purification apparatus, the regeneration fuel quantity can be changed by changing setting of the target temperature by the execution mode setting device. In this case, when the regeneration fuel quantity is to be made smaller so as to set the second specified remaining quantity to a desired quantity as described above, the execution mode setting device may set the target temperature to a higher temperature.

By changing the target temperature to a higher temperature, regeneration of the exhaust gas purification ability of the exhaust gas purification apparatus during execution of the regeneration control can be further promoted. Thus, the execution time of the regeneration control can be shortened, whereby the regeneration fuel quantity can be made smaller.

According to the present invention, the regeneration fuel quantity estimation device may estimate the regeneration fuel quantity based on the operation state of the internal combustion engine before execution of the regeneration control. However, the operation state of the internal combustion engine during actual execution of the filter regeneration control may be different from the operation state of the internal combustion engine before execution of the regeneration control, in some cases. In such cases, there is a possibility that the quantity of fuel that is actually needed for the regeneration control is different from the regeneration fuel quantity estimated by the regeneration fuel quantity estimation device.

In view of this, in the case as described above, if it is determined, while warning is given by the warning apparatus and the execution control is being executed, that the quantity of fuel that is needed for the regeneration control is larger than the aforementioned regeneration fuel quantity estimated by the regeneration fuel quantity estimation device, execution of the regeneration control may be stopped at the time when the fuel quantity equal to the regeneration fuel quantity estimated by the regeneration fuel estimation device is consumed in the regeneration control.

With this feature, in cases where the regeneration control is executed while warning is given by the warning apparatus, it can be prevented that a quantity of fuel larger than the regeneration fuel quantity estimated by the regeneration fuel quantity estimation device is consumed in the regeneration control. Accordingly, the quantity of fuel that can be used to drive the internal combustion engine after the start of warning by the warning apparatus can be prevented, with higher reliability, from becoming smaller than the first specified remaining quantity. Thus, the possible travel distance of the vehicle after the start of warning by the warning apparatus can be prevented, with higher reliability, from being unduly shortened.

BEST MODE FOR CARRYING OUT THE INVENTION

In the following, specific embodiments of the exhaust gas purification apparatus regeneration system of an internal combustion engine according to the present invention will be described with reference to the drawings.

Embodiment 1

<General Structure of Air-Intake and Exhaust systems and Fuel System of Internal Combustion Engine>

Figure 1:
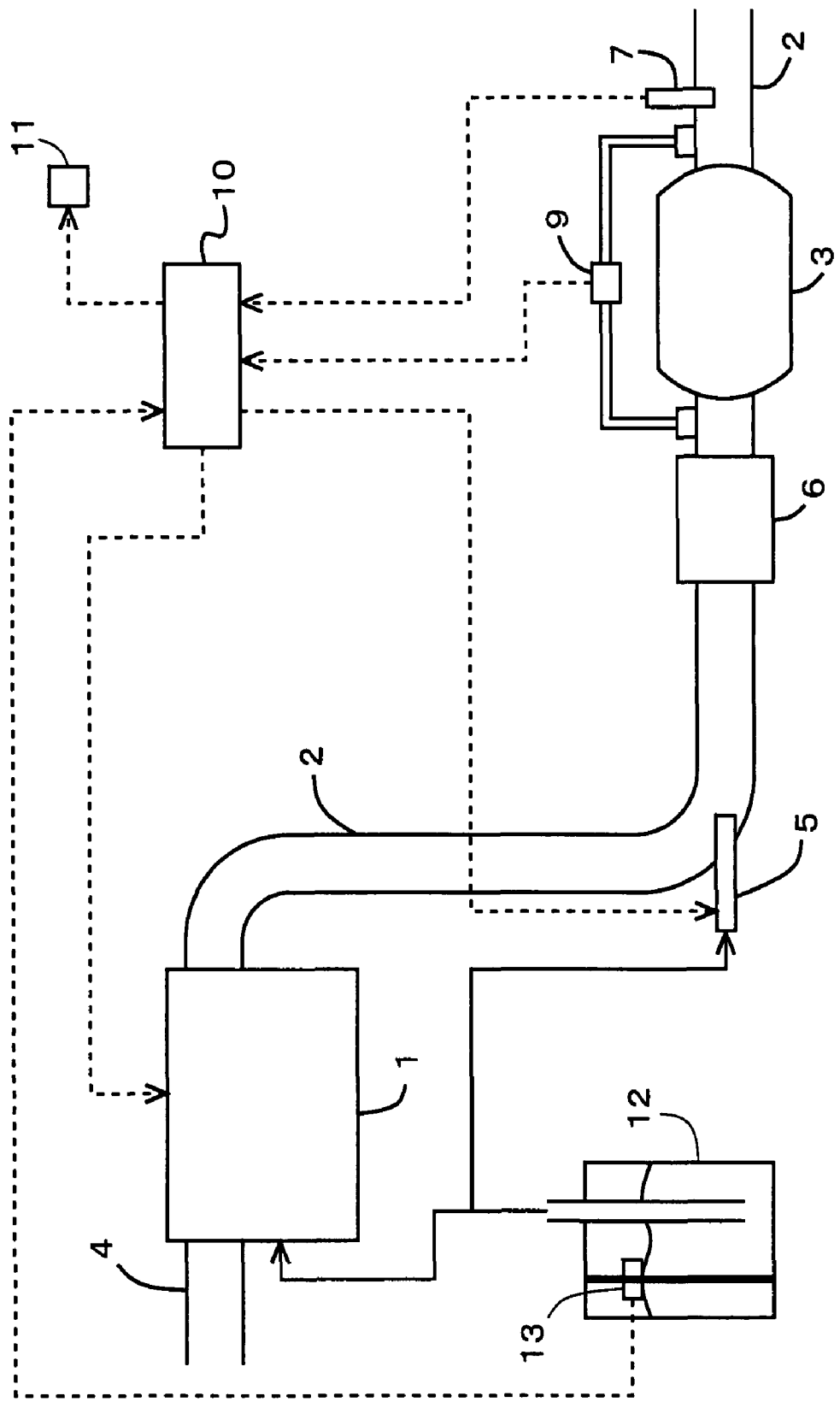
FIG. 1 illustrate the general structure of air-intake and exhaust systems and a fuel system of an internal combustion engine according to an embodiment of the present invention.

Here, the present invention will be described taking as an example a case in which the present invention is applied to a diesel engine for driving a vehicle. FIG. 1 illustrates the general structure of air-intake and exhaust systems and a fuel system of an internal combustion engine according to the embodiment.

The internal combustion engine 1 is a diesel engine for driving a vehicle. To the internal combustion engine 1 are connected an intake passage 4 and an exhaust passage 2. An oxidation catalyst 6 is provided in the exhaust passage 2. A filter 3 for trapping PM contained in the exhaust gas is provided in the exhaust passage 2 in the downstream of the oxidation catalyst 6. The filter 3 supports an NOx catalyst on it. In this embodiment, the oxidation catalyst 6 and the filter 3 constitute the exhaust gas purification apparatus according to the present invention.

A fuel addition valve 5 for adding fuel into the exhaust gas is provided in the exhaust passage 2 in the upstream of the oxidation catalyst 6. In the exhaust passage 2, there is also provided a pressure difference sensor 9 that outputs an electric signal indicative of the difference between the pressure in the exhaust passage 2 downstream of the oxidation catalyst 6 and upstream of the filter 3 and the pressure in the exhaust passage 2 downstream of the filter 3. Furthermore, an exhaust gas temperature sensor 7 that outputs an electric signal indicative of the temperature of the exhaust gas flowing in the exhaust passage 2 is provided in the exhaust passage 2 in the downstream of the filter 3.

In a fuel tank 12 that stores fuel to be supplied to the fuel injection valve of the internal combustion engine 1 and the fuel addition valve 5, there is provided a float sensor 13 that outputs an electric signal indicative of the fuel level.

To the internal combustion engine 1 having the above-described structure is annexed an electronic control unit (ECU) 10 that controls the internal combustion engine 1. The ECU 10 is a unit for controlling the operation state of the internal combustion engine 1 according to operation conditions of the internal combustion engine 1 and driver's demands. The ECU 10 is electrically connected with various sensors such as the pressure difference sensor 9, the exhaust gas temperature sensor 7 and the float sensor 13. The output signals from these sensors are input to the ECU 10. The ECU 10 estimates the amount of PM deposited in the filter 3 based on the value of the output from the pressure difference sensor 9. The ECU 10 also estimates the temperature of the filter 3 based on the value of the output from the exhaust gas temperature sensor 7. The ECU 10 also estimates the remaining fuel quantity based on the value of the output from the float sensor 13. Furthermore, the ECU 10 is electrically connected with the fuel addition valve 5 and the fuel injection valve of the internal combustion engine 1, which are controlled by the ECU 10. In the driver's cabin of the vehicle on which the internal combustion engine 1 according to this embodiment is mounted, there is provided a warning lamp 11 that gives warning of excessive smallness of the fuel quantity. The warning lamp 11 is electrically connected with the ECU 10.

<Filter Regeneration Control>

When the amount of PM deposited in the filter 3 becomes excessively large, the PM trapping ability of the filter 3 is deteriorated. This leads to deterioration of the exhaust gas purification ability of the filter. Furthermore, when the amount of PM deposited in the filter 3 increases excessively, there is a risk that an increase in the pressure in the exhaust passage 2 upstream of the filter 3 may unduly affect the operation state of the internal combustion engine 1. In view of this, according to this embodiment, when the amount of PM deposited in the filter 3 becomes larger than a regeneration start deposition amount, execution of a filter regeneration control is started so as to oxidize and remove the PM.

The filter regeneration control according to this embodiment is performed by adding fuel into the exhaust gas through the fuel addition valve 5, thereby supplying the fuel to the oxidation catalyst 6 and the filter 3. The fuel supplied to them is oxidized by the oxidation catalyst 6 or the NOx catalyst supported on the filter 3. Oxidation heat generated thereby raises the temperature of the filter 3 to a target temperature, whereby the deposited PM is oxidized and removed.

Here, the regeneration start deposition amount is an amount smaller than the amount of deposited PM that involves a risk that excessive temperature rise of the filter 3 may be caused by heat generated by oxidation of the PM. The target temperature is a temperature at which the PM deposited in the filter 3 can be removed by oxidation while excessive temperature rise of the filter 3 can be prevented.

In the filter regeneration control, the temperature of the filter 3 may be controlled to the target temperature by controlling the quantity of fuel added through the fuel addition valve 5 per unit time and/or the flow rate of the exhaust gas flowing through the filter 3.

After execution of the filter regeneration control according to this embodiment has been started, the execution thereof is terminated when the amount of PM deposited in the filter 3 is decreased below a regeneration termination deposition amount.

In this embodiment, the execution mode of the filter regeneration control is set to a specified execution mode that is determined in advance. Specifically, the regeneration start deposition amount, the regeneration termination deposition amount and the target temperature are, respectively, a specified regeneration start deposition amount, a specified regeneration termination deposition amount and a specified target temperature that are determined in advance.

In the filter regeneration control, fuel may be supplied to the oxidation catalyst 6 and the filter 3 by performing sub fuel injection in the internal combustion engine 1 instead of adding fuel through the fuel addition valve 5.

<Warning Lamp Lighting Control>

In this embodiment, when the quantity of the fuel remaining in the fuel tank 12 is below a certain level, a warning lamp lighting control for lighting the warning lamp 11 is executed to warn the driver of excessive smallness of the fuel quantity.

In the warning lamp lighting control according to this embodiment, during normal running, lighting of the warning lamp 11 is started by the ECU 10 when the remaining fuel quantity becomes equal to or smaller than a first specified remaining quantity. Lighting of the warning lamp 11 is continued as long as the remaining fuel quantity is equal to or smaller than the first specified remaining quantity.

Here, the normal running refers to the situation in which the filter regeneration control is not executed when the remaining fuel quantity is equal to or smaller than the first specified remaining quantity. The first specified remaining quantity may be a predetermined fuel quantity that is considered to be the minimum fuel quantity necessary to drive the vehicle on which the internal combustion engine 1 is mounted while normal running until the time of refueling the vehicle.

In this embodiment, the amount of PM deposited in the filter 3 may possibly become equal to or larger than the regeneration start deposition amount after the remaining fuel quantity has become equal to or smaller than the first specified remaining quantity, in some cases. In such cases, the filter regeneration control will be executed in the state in which the remaining fuel quantity is equal to or smaller than the first specified remaining quantity. This means that a portion of the remaining fuel that is equal to or smaller in quantity than the first specified remaining quantity is not used for driving the internal combustion engine 1 but for fuel addition through the fuel addition valve 5. Accordingly, if lighting of the warning lamp 11 is started at the time when the remaining fuel quantity becomes equal to or smaller than the first specified remaining quantity as with during normal running, there is a possibility that the possible travel distance of the vehicle after the start of lighting of the warning lamp becomes shorter than that in the case where the filter regeneration control is not executed when the remaining fuel quantity is equal to or smaller than the first specified remaining quantity.

In view of the above, in the warning lamp lighting control according to this embodiment, in the case where it is predicted that the filter regeneration control will be executed when the remaining fuel quantity is equal to or smaller than the first specified remaining quantity, the warning lamp 11 is lit also when the remaining fuel quantity is equal to or smaller than a second specified remaining quantity that is larger than the first specified remaining quantity. That is in short, lighting of the warning lamp is started when the remaining fuel quantity becomes equal to the second specified remaining quantity.

By this feature, a larger quantity of fuel can be used for driving the internal combustion engine 1 even when the filter regeneration control is executed while the warning lamp 11 is on. Therefore, the possible travel distance of the vehicle after lighting of the warning lamp 11 is started can be prevented from being unduly shortened.

<Control Routine of Warning Lamp Lighting Control>

Figure 2:
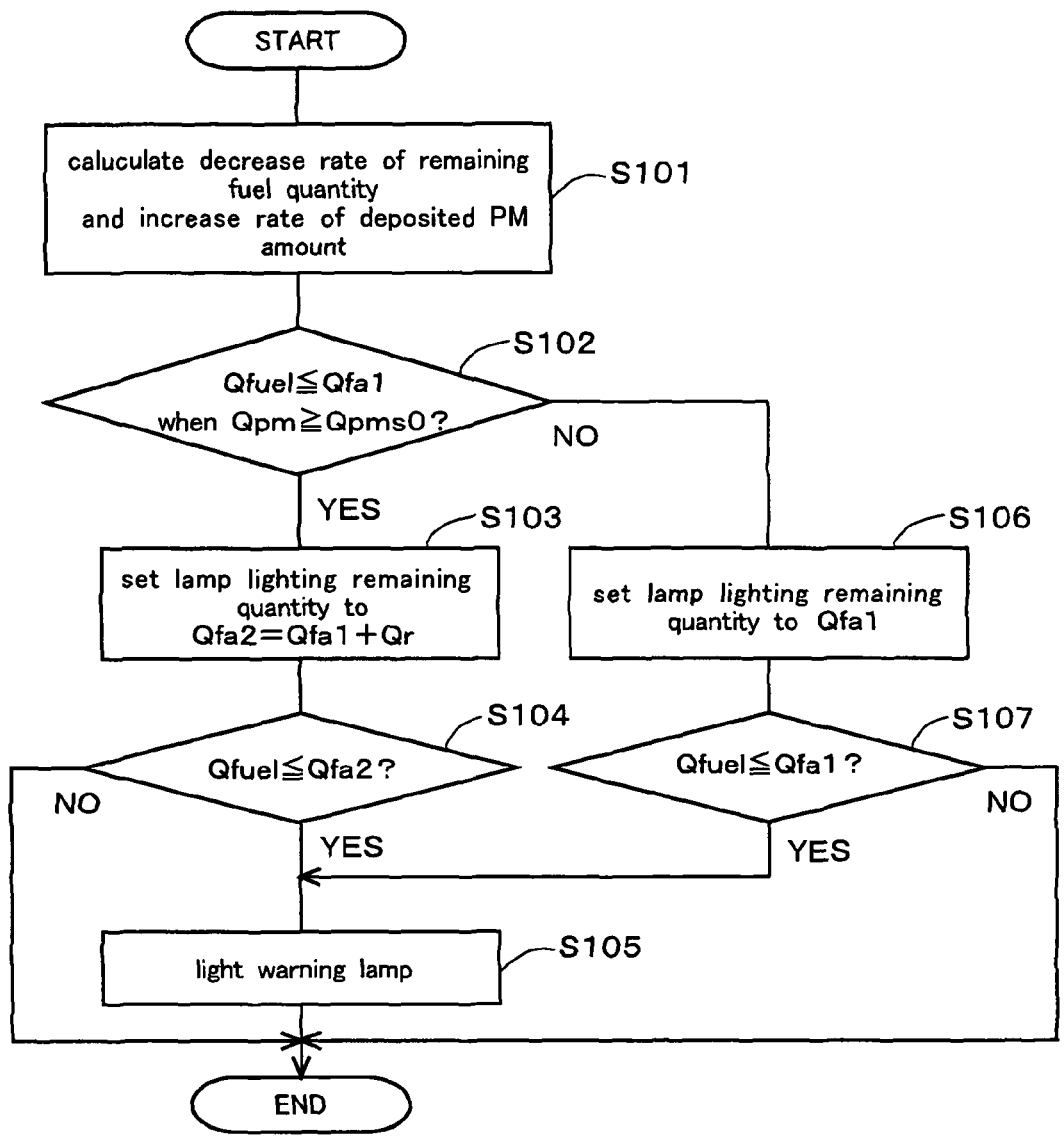
FIG. 2 is a flow chart of a control routine of a warning lamp lighting control according to embodiment 1 of the present invention.

In the following, a control routine of the warning lamp lighting control according to this embodiment will be described with reference to the flow chart shown in FIG. 2. This routine is stored in the ECU 10 in advance and executed at specified time intervals while the internal combustion engine 1 is running.

In this routine, first in step S101, the ECU 10 calculates the decrease rate of the remaining fuel quantity and the increase rate of the amount of PM deposited in the filter 3. Here, the decrease rate of the remaining fuel quantity refers to the decrease in the remaining fuel quantity per unit time. The increase rate of the amount of deposited PM refers to the increase in the amount of deposited PM per unit time.

Next, the process of the ECU 10 proceeds to step S102, where the ECU 10 makes a determination as to whether or not the amount of deposited PM Qpm will become equal to or larger than a specified regeneration start deposition amount Qpms0 when the remaining fuel quantity Qfuel is equal to or smaller than the first specified remaining quantity Qfa1 based on the decrease rate of the remaining fuel quantity and the increase rate of the amount of PM deposited in the filter 3 calculated in step S101, the current remaining fuel quantity Qfuel and the current amount of deposited PM Qpm. In other words, the ECU 10 makes a prediction as to whether or not the filter regeneration control will be executed when the remaining fuel quantity Qfuel is equal to or smaller than the first specified remaining quantity Qfa1.

If the determination in S102 is affirmative, namely if it is predicted that the filter regeneration control will be executed when the remaining fuel quantity Qfuel is equal to or smaller than the first specified remaining quantity Qfa1, the process of the ECU 10 proceeds to S103. On the other hand, if the determination in S102 is negative, namely if it is predicted that the filter regeneration control will not be executed when the remaining fuel quantity Qfuel is equal to or smaller than the first specified remaining quantity Qfa1, the process of the ECU proceeds to S106.

In S106, the ECU 10 sets the first specified remaining quantity Qfa1 as a lamp lighting remaining quantity, which serves as a threshold value of the remaining fuel quantity for lighting the warning lamp 11.

Then, the process of the ECU 10 proceeds to step S107, where the ECU 10 makes a determination as to whether or not the current remaining fuel quantity Qfuel is equal to or smaller than the first specified remaining quantity Qfa1. If the determination in step S107 is affirmative, the process of the ECU 10 proceeds to step S105, and if the determination is negative, the ECU 10 once terminates the execution of this routine.

In step S105, the ECU 10 lights the warning lamp 11, and then terminates the execution of this routine.

On the other hand, in step S103, the ECU 10 sets the second specified remaining quantity Qfa2 as the lamp lighting remaining quantity. The second specified remaining quantity Qfa2 is the sum of the first specified remaining quantity Qfa1 and regeneration fuel quantity Qr. Here, the regeneration fuel quantity Qr is the quantity of the fuel used in the filter regeneration control when the filter regeneration control is executed, that is, the quantity of the fuel added through the fuel addition valve 5.

Here, a method of calculating the regeneration fuel quantity Qr according to this embodiment will be described. The regeneration fuel quantity Qr can be calculated based on the execution mode of the filter regeneration control and the operation state of the internal combustion engine 1 during execution of the filter regeneration control. In this embodiment, the execution mode of the filter regeneration control is a specified execution mode determined in advance, as described before. In this embodiment, the operation state of the internal combustion engine 1 during execution of the filter regeneration control is assumed to be such an operation state in which the regeneration fuel quantity Qr needed is the largest. This operation state can be determined, for example, by experiments.

That is to say, according to this embodiment, the regeneration fuel quantity Qr is calculated as the quantity of fuel added through the fuel addition valve 5 that is needed to decrease the amount of PM deposited in the filter 3 from the specified regeneration start deposition amount Qpms0 to the specified regeneration termination deposition amount Qpmf0 while the internal combustion engine 1 is in such an operation state in which the regeneration fuel quantity Qr needed is the largest and the temperature of the filter 3 is equal to the specified target temperature T0.

In this embodiment, since the regeneration fuel quantity Qr is calculated according to the above described method, the regeneration fuel quantity Qr is a predetermined value. Accordingly, the second specified remaining quantity Qfa2 according to this embodiment is also a predetermined value, as with the first specified remaining quantity Qfa1. In this connection, the second specified remaining quantity Qfa2 is necessarily larger than the first specified remaining quantity Qfa1.

After setting the lamp lighting remaining quantity to the second specified remaining quantity Qfa2 in step S103, the process of the ECU 10 proceeds to step S104, where the ECU 10 makes a determination as to whether or not the current remaining fuel quantity Qfuel is equal to or smaller than the second specified remaining quantity Qfa2. If the determination in step S104 is affirmative, the process of the ECU 10 proceeds to step S105, and if the determination is negative, the ECU 10 once terminates execution of this routine.

According to the above described control routine, if it is predicted that the filter regeneration control will be executed when the remaining fuel quantity is equal to or smaller than the first remaining quantity Qfa1, the warning lamp 11 is lit when the remaining fuel quantity is equal to or smaller than the second specified remaining quantity Qfa2 that is equal to the sum of the first specified remaining quantity Qfa1 and the regeneration fuel quantity Qr. That is in short, lighting of the warning lamp 11 is started when the remaining fuel quantity becomes equal to the second specified remaining quantity Qfa2. Lighting of the warning lamp 11 is continued as long as the remaining fuel quantity is equal to or smaller than the second specified remaining quantity Qfa2.

In this embodiment, the regeneration fuel quantity Qr is calculated under the assumption that the operation state of the internal combustion 1 during execution of the filter regeneration control is such an operation state in which the regeneration fuel quantity Qr needed is the largest. Therefore, the quantity of fuel actually used in regeneration will be equal to or smaller than the regeneration fuel quantity Qr whatever the actual operation state of the internal combustion engine 1 is when the filter regeneration control is executed.

Therefore, according to this embodiment, even when the filter regeneration control is executed while the warning lamp 11 is on, a quantity of fuel that is equal to or larger than the first specified remaining quantity Qfa1 can be used for driving the internal combustion engine 1 after lighting of the warning lamp 11 is started. Accordingly, even when the filter regeneration control is executed while the warning lamp 11 is on, the possible travel distance of the vehicle after lighting of the warning lamp 11 is started can be prevented from being unduly shortened.

Embodiment 2

The general structure of the air-intake and exhaust systems and the fuel system of an internal combustion engine according to this embodiment is the same as the above described embodiment 1, and descriptions thereof will be omitted.
<Filter Regeneration Control and Lamp Lighting Control>

A filter regeneration control is performed also in this embodiment by adding fuel into the exhaust gas through the fuel addition valve 5 so as to remove the PM deposited in the filter 3 as with embodiment 1. A warning lamp lighting control for lighting the warning lamp 11 is also performed so as to warn the driver of excessive smallness of the fuel quantity. In the following, the filter regeneration control and the lamp lighting control according to this embodiment will be described.

In the warning lamp lighting control according to this embodiment also, lighting of the warning lamp 11 is started at the time when the remaining fuel quantity becomes equal to or smaller than a first specified remaining quantity. When it is predicted that the filter regeneration control will be executed when the remaining fuel quantity is equal to or smaller than the first specified remaining quantity, lighting of the warning lamp 11 is started at the time when the remaining fuel quantity becomes equal to or smaller than a second specified remaining quantity that is larger than the first specified remaining quantity.

The second specified remaining quantity is calculated as the sum of the first specified remaining quantity and the regeneration fuel quantity, as is the case with embodiment 1. In embodiment 1, the regeneration fuel quantity is calculated under the assumption that the operation state of the internal combustion engine 1 during execution of the filter regeneration control is such an operation state in which the regeneration fuel quantity Qr needed is the largest. However, in this embodiment, the regeneration fuel quantity is calculated under the assumption that the operation state of the internal combustion engine 1 during execution of the filter regeneration control is the same as the operation state at the time when the prediction that the filter regeneration control will be executed when the remaining fuel quantity is equal to or smaller than the first specified remaining quantity is made.

Furthermore, in this embodiment, the regeneration fuel quantity is first calculated under the assumptions that the operation state of the internal combustion engine 1 during execution of the filter regeneration control is the above described operation state and that the execution mode of the filter regeneration control is a specified execution mode determined in advance. Then, if the regeneration fuel quantity thus calculated is larger than the a predetermined quantity, the setting of execution mode of the filter regeneration control is changed to a mode different from the specified execution mode so that the regeneration fuel quantity becomes equal to the predetermined quantity.

Here, the predetermined quantity is such a threshold quantity that if, in the case where lighting of the warning lamp 11 is started at the time when the remaining fuel quantity becomes equal to the second specified remaining quantity, the regeneration fuel quantity is larger than that predetermined quantity, it can be determined that the second specified remaining quantity is too large, in other words, that the time at which lighting of the warming lamp 11 is started is too early. This predetermined quantity is determined in advance by, for example, experiments.

By making the fuel regeneration quantity equal to the predetermined quantity as described above, lighting of the warning lamp 11 can be prevented from being started too early in the case where the filter regeneration control is executed when the remaining fuel quantity is equal to or smaller than the first specified remaining quantity. This means that the difference between the time at which lighting of the warning lamp 11 is started during normal running and the time at which lighting of the warning lamp 11 is started in the situation where the filter regeneration control is executed when the remaining fuel quantity is equal to or smaller than the first specified remaining quantity can be prevented from becoming unduly large.
<Method of Changing Execution Mode Setting of Filter Regeneration Control>

In this embodiment, when the setting of execution mode of the filter regeneration control is to be changed in order to make the regeneration fuel quantity equal to the predetermined quantity for the reason that the regeneration fuel quantity calculated under the assumption that the execution mode of the filter regeneration control is the specified execution mode is larger than the predetermined quantity, the regeneration start deposition amount may be changed to an amount smaller than the specified regeneration start deposition amount, the regeneration termination deposit amount may be changed to an amount larger than the specified regeneration termination amount, and/or the target temperature may be changed to a temperature higher than the specified target temperature.

In the case that the regeneration start deposition amount is changed to an amount smaller than the specified regeneration start deposition amount or in the case that the regeneration termination deposition amount is changed to an amount larger than the specified regeneration termination deposition amount, the regeneration fuel quantity can be made smaller since the execution time of the filter regeneration control can be shortened.

Also in the case that the target temperature in the filter regeneration control is changed to a temperature higher than the specified target temperature, the execution time of the filter regeneration control can be shortened since the oxidation and removal of PM is promoted further. Accordingly, the regeneration fuel quantity can be made smaller.

In this embodiment, the condition for starting execution of the filter regeneration control is that the amount of PM deposited in the filter 3 becomes equal to or larger than the regeneration start deposition amount. However, the condition for starting execution of the filter regeneration control may be that the integrated value of the fuel injection quantity in the internal combustion engine 1 since the time at which the last filter regeneration control ended becomes equal to or lager than a specified injection quantity. In this case, when the regeneration fuel quantity is to be made smaller, the specified injection quantity may be changed to a smaller quantity thereby making the time to start execution of the filter regeneration control earlier. The condition for starting execution of the filter regeneration control may be that the integrated value of the travel distance of the vehicle on which the internal combustion engine 1 is mounted since the time at which the last filter regeneration control ended becomes equal to or longer than a specified distance. In this case, when the regeneration fuel quantity is to be made smaller, the specified distance may be made smaller thereby making the time to start execution of the filter regeneration control earlier. As per the above, by making the time to start execution of the filter regeneration control earlier, execution of the filter regeneration control can be started at a time when the amount of PM deposited in the filter 3 is smaller, whereby the execution time of the filter regeneration control can be shortened.

<Control Routine of Warning Lamp Lighting Control>

Figure 3:
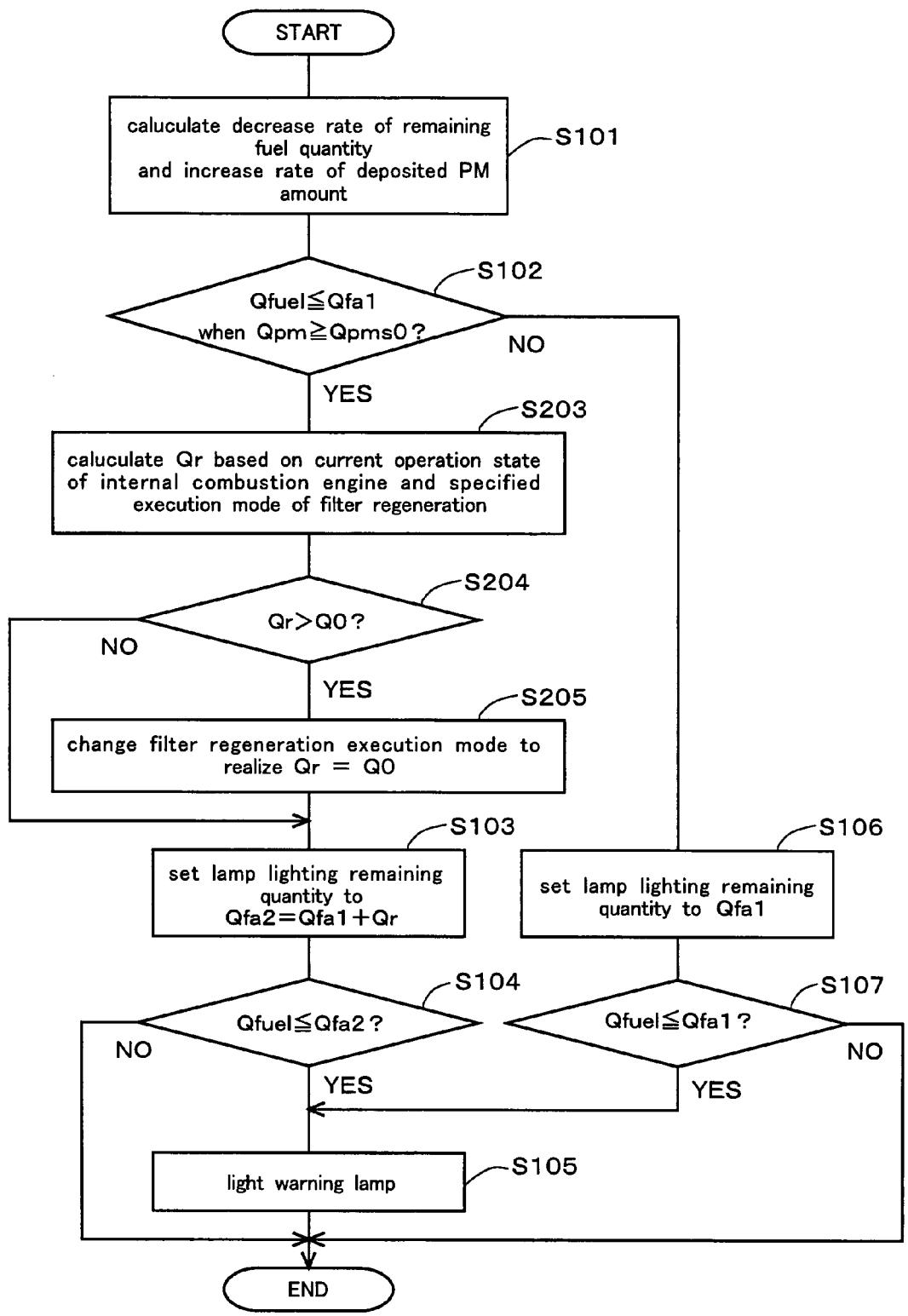
FIG. 3 is a flow chart of a control routine of a warning lamp lighting control according to embodiment 2 of the present invention.

In the following, a control routine of a warning lamp lighting control according to this embodiment will be described with reference to the flow chart shown in FIG. 3. Steps S101 through S107 in this routine are the same as those in the control routine of the warning lamp lighting in the above described embodiment 1, and descriptions thereof will be omitted. This routine is stored in the ECU 10 in advance and executed at specified time intervals while the internal combustion engine 1 is running.

In this routine, if the determination in step S102 is affirmative, namely if it is predicted that the filter regeneration control will be executed when the remaining fuel quantity Qfuel is equal to or smaller than the first specified remaining quantity Qfa1, the process of the ECU 10 proceeds to S203.

In step S203, the ECU 10 calculates the regeneration fuel quantity Qr under the assumptions that the operation state of the internal combustion engine 1 during execution of the filter regeneration control is the same as the current operation state of the internal combustion engine 1, and that the execution mode of the filter regeneration control is the aforementioned specified execution mode.

Next, the process of the ECU 10 proceeds to step S204, where the ECU 10 makes a determination as to whether or not the regeneration fuel quantity Qr calculated in step S203 is larger than a predetermined quantity Q0. If the determination in step S204 is affirmative, the process of the ECU 10 proceeds to step S205, and if the determination is negative, the process of the ECU 10 proceeds to step S103.

In step S205, the ECU 10 changes the setting of execution mode of the filter regeneration control according to the above described method so that the regeneration fuel quantity Qr becomes the predetermined fuel quantity Q0. After that, the process of the ECU 10 proceeds to step S103. In this case, the regeneration fuel quantity Qr in step S103 is the predetermined quantity Q0. Therefore, the second specified remaining quantity Qfa2 is equal to the sum of the first specified remaining quantity Qfa1 and the predetermined quantity Q0.

In step S205, the setting of execution mode of the filter regeneration control may be changed in such a way that the regeneration fuel quantity Qr becomes equal to or smaller than the predetermined quantity Q0. In this case, the second specified remaining quantity Qfa2 set in step S103 is equal to or smaller than the sum of the first specified remaining quantity Qfa1 and the predetermined quantity Q0.

In this embodiment also, if it is predicted that the filter regeneration control will be executed when the remaining fuel quantity is equal to or smaller than the first specified remaining quantity Qfa1, the warning lamp is lit when the remaining fuel quantity is equal to or smaller than the second specified remaining quantity Qfa2 that is equal to the sum of the first specified remaining quantity Qfa1 and the regeneration fuel quantity Qr.

According to the above described control routine, the regeneration fuel quantity Qr is equal to or smaller than the predetermined quantity Q0. Therefore, the second specified remaining quantity Qfa2 is prevented from becoming unduly large.

Therefore, according to this embodiment, even when the filter regeneration control is executed while the warning lamp 11 is on, the possible travel distance of the vehicle after lighting of the warning lamp 11 is started can be prevented from being unduly shortened. In addition, the difference between the time at which lighting of the warning lamp 11 is started during normal running and the time at which lighting of the warning lamp 11 is started in the situation where the filter regeneration control will be executed when the remaining fuel quantity is equal to or smaller than the first specified remaining quantity can be prevented from becoming unduly large.

In this embodiment, the regeneration fuel quantity is calculated under the assumption that the operation state of the internal combustion engine 1 during execution of the filter regeneration control is the same as the operation state at the time when the prediction that the filter regeneration control will be executed when the remaining fuel quantity is equal to or smaller than the first specified remaining quantity is made. However, the operation state of the internal combustion engine 1 during actual execution of the filter regeneration control may be different from the operation state assumed as above, in some cases. In such cases, there is a possibility that the quantity of fuel that is actually needed in reducing the amount of deposited PM to the regeneration termination deposition amount by the filter regeneration control is different from the regeneration fuel quantity calculated before execution of the filter regeneration control or at the time of setting the second specified remaining quantity.

In view of this, in this embodiment, if it is determined, while the warning lamp 11 is on and the filter regeneration control is being executed, that the quantity of fuel that is actually needed to reduce the amount of deposited PM to the regeneration termination deposition amount is larger than the regeneration fuel quantity calculated at the time of setting the second specified remaining quantity, execution of the filter regeneration control is stopped at the time when a fuel quantity equal to the regeneration fuel quantity calculated at the time of setting the second specified remaining quantity is consumed in the filter regeneration control.

With the above feature, it can be prevented that a quantity of fuel larger than the regeneration fuel quantity calculated at the time of setting the second specified remaining quantity is consumed in the filter regeneration control in the case where the filter regeneration control is executed while the warning lamp 11 is on. Accordingly, the quantity of fuel that can be used to drive the internal combustion engine 1 after lighting of the warning lamp 11 is started can be prevented, with higher reliability, from becoming smaller than the first specified remaining quantity. Thus, the possible travel distance of the vehicle after lighting of the warning lamp 11 is started can be prevented, with higher reliability, from being unduly shortened.

Embodiment 3

The general structure of the air-intake and exhaust systems and the fuel system of an internal combustion engine according to this embodiment is the same as the above described embodiment 1, and descriptions thereof will be omitted.
<Filter Regeneration Control and Lamp Lighting Control>

A filter regeneration control is performed also in this embodiment by adding fuel into the exhaust gas through the fuel addition valve 5 so as to remove the PM deposited in the filter 3 as with embodiment 1. A warning lamp lighting control for lighting the warning lamp 11 is also performed so as to warn the driver of excessive smallness of the fuel quantity. In the following, the filter regeneration control and the lamp lighting control according to this embodiment will be described.

In the warning lamp lighting control according to this embodiment also, lighting of the warning lamp 11 is started at the time when the remaining fuel quantity becomes equal to or smaller than a first specified remaining quantity. When it is predicted that the filter regeneration control will be executed when the remaining fuel quantity is equal to or smaller than the first specified remaining quantity, lighting of the warning lamp 11 is started at the time when the fuel becomes equal to or smaller than a second specified remaining quantity that is larger than the first specified remaining quantity.

The second specified remaining quantity is calculated as the sum of the first specified remaining quantity and the regeneration fuel quantity, as is the case with embodiment 1. In this embodiment, as with embodiment 2, the regeneration fuel quantity is calculated under the assumption that the operation state of the internal combustion engine 1 during execution of the filter regeneration control is the same as the operation state at the time when the prediction that the filter regeneration control will be executed when the remaining fuel quantity is equal to or smaller than the first specified remaining quantity is made.

Furthermore, in this embodiment, as with embodiment 2, the regeneration fuel quantity is first calculated under the assumptions that the operation state of the internal combustion engine 1 during execution of the filter regeneration control is the above described operation state, and that the execution mode of the filter regeneration control is a specified execution mode determined in advance. Then, if the second specified remaining quantity defined as the sum of the regeneration fuel quantity thus calculated and the first specified remaining quantity is larger than the remaining fuel quantity at the time when the prediction that the filter regeneration control will be executed when the remaining fuel quantity is equal to or smaller than the first specified fuel quantity is made, the setting of execution mode of the filter regeneration control is changed so that the second specified remaining quantity becomes equal to the remaining fuel quantity at that time.

The way of changing the setting of execution mode of the filter regeneration control is the same as that in embodiment 2.
<Control Routine of Lamp Lighting Control>

Figure 4:
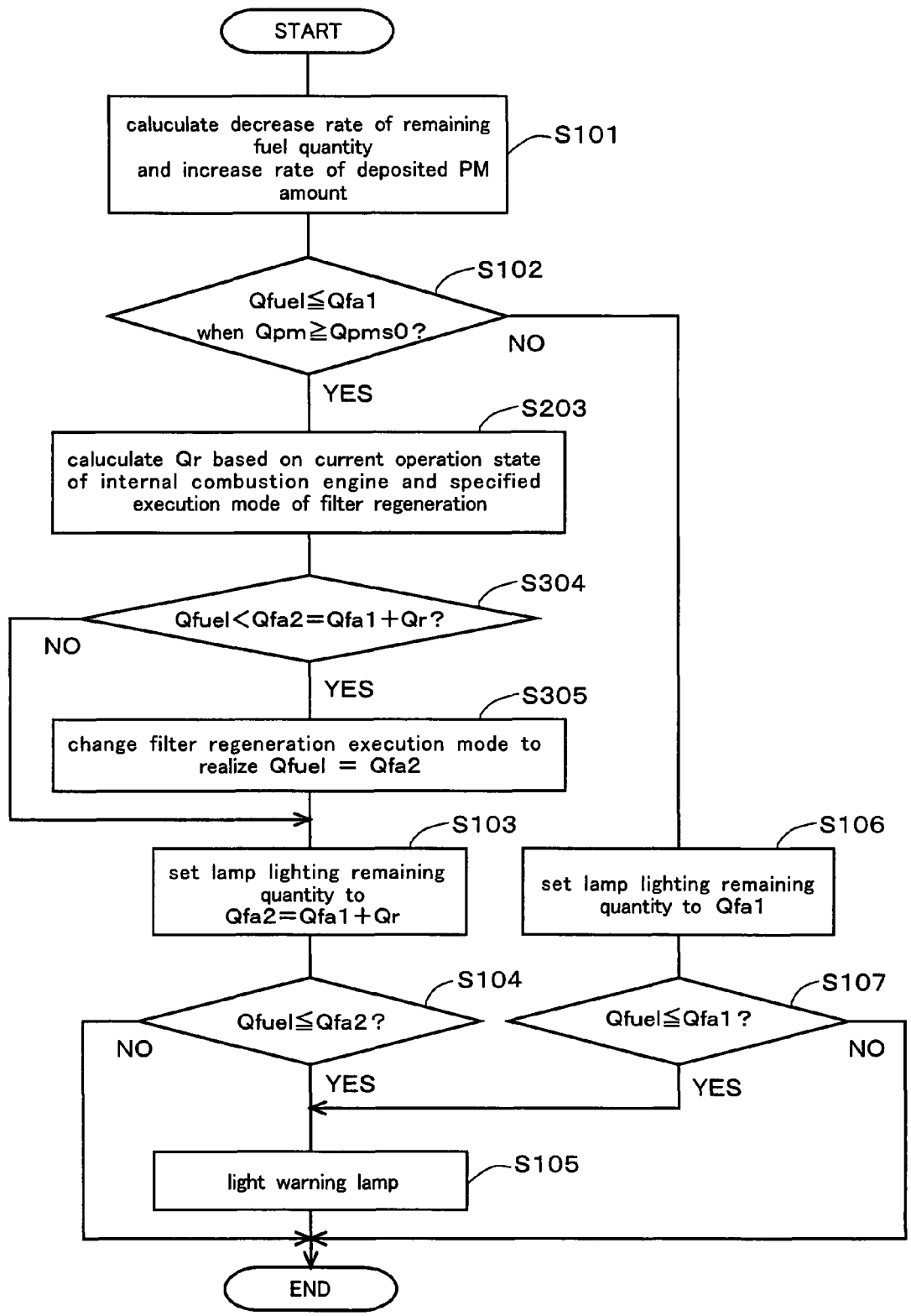
FIG. 4 is a flow chart of a control routine of a warning lamp lighting control according to embodiment 3 of the present invention.

In the following, a control routine of the warning lamp lighting control according to this embodiment will be described with reference to the flow chart shown in FIG. 4. The steps S101 through S107 and S203 are the same as those in the control routine of the warning lamp lighting control in the above described embodiment 2, and descriptions thereof will be omitted. This routine is stored in the ECU 10 in advance and executed at specified time intervals while the internal combustion engine 1 is running.

In this routine, in step S203, the ECU 10 calculates the regeneration fuel quantity Qr under the assumptions that the operation state of the internal combustion engine 1 during execution of the filter regeneration control is the same as the current operation state of the internal combustion engine 1, and that the execution mode of the filter regeneration control is the aforementioned specified execution mode, and then the process of the ECU 10 proceeds to step S304.

In step S304, the ECU sets the second specified remaining quantity Qfa2 as the sum of the first specified remaining quantity Qfa1 and the regeneration fuel quantity Qr calculated in step S203, and makes a determination as to whether or not the second specified remaining quantity Qfa2 is larger than the current remaining fuel quantity Qfuel. If the determination in step S304 is affirmative, the process of the ECU 10 proceeds to step S305, while the determination is negative, the process of the ECU 10 proceeds to step S103.

In step S305, the ECU 10 changes the setting of execution mode of the filter regeneration control so that the second specified remaining quantity Qfa2 becomes equal to the current remaining fuel quantity Qfuel. Then, the process of the ECU 10 proceeds to step S103. In this case, the determination in step S104 subsequent to step S103 is necessarily affirmative, and the process of the ECU 10 proceeds to step S105, where the warning lamp 11 is lit.

In the above described control routine, the second specified remaining quantity Qfa2 is equal to or smaller than the remaining fuel quantity at the time when the prediction that the filter regeneration control will be executed when the remaining fuel quantity is equal to or smaller than the first specified remaining quantity Qfa1 is made.

According to this embodiment as described above, the first specified remaining quantity of fuel can be reserved as fuel that can be used for driving the internal combustion engine 1 after the start of lighting of the warning lamp with higher reliability.

Although cases in which the regeneration control according to the present invention is applied to filter regeneration control have been described as embodiments 1 to 3, similar warning lamp lighting control may be applied also to cases in which the regeneration control is applied to SOx-poisoning regeneration control for reducing and removing SOx stored in NOx catalyst supported on the filter 3. Embodiments 1 to 3 may be combined as far as possible.

INDUSTRIAL APPLICABILITY

According to the present invention, in a regeneration system of an exhaust gas purification apparatus of an internal combustion engine, even in cases where regeneration control is executed when warning of excessive smallness of the fuel quantity is given by a warning apparatus, the possible travel distance of the vehicle after lighting of the warning lamp is started can be prevented from being unduly shortened.

The invention claimed is:

1. An exhaust gas purification apparatus regeneration system of an internal combustion engine that starts, when a regeneration start condition is satisfied, execution of regeneration control for regenerating the exhaust gas purification ability of an exhaust gas purification apparatus by supplying fuel to the exhaust gas purification apparatus provided in an exhaust passage of the internal combustion engine, comprising:
a warning apparatus that gives warning when a remaining fuel quantity is equal to or smaller than a first specified remaining quantity; and
a controller that is programmed to predict the time at which said regeneration control will be executed,
wherein when the controller predicts that the regeneration control will be executed when the remaining fuel quantity is equal to or smaller than said first specified remaining quantity, said warning apparatus further gives warning also when the remaining fuel quantity is equal to or smaller than a second specified remaining quantity that is larger than said first specified remaining quantity.

2. An exhaust gas purification apparatus regeneration system of an internal combustion engine according to claim 1, wherein:
the controller is programmed to estimate a regeneration fuel quantity defined as the quantity of fuel used in said regeneration control, and
said second specified remaining quantity is set as the sum of said first specified remaining quantity and said regeneration fuel quantity estimated by said controller.

3. An exhaust gas purification apparatus regeneration system of an internal combustion engine according to claim 2, wherein:
the controller is programmed to set an execution mode of said regeneration control,
said controller is programmed to estimate said regeneration fuel quantity based on the execution mode of said regeneration control set by the controller, and
said controller is programmed to set the execution mode of said regeneration control so that said regeneration fuel quantity estimated by said controller becomes equal to or smaller than a predetermined quantity.

4. An exhaust gas purification apparatus regeneration system of an internal combustion engine according to claim 2, wherein:
the controller is programmed to set an execution mode of said regeneration control,
the controller is programmed to estimate said regeneration fuel quantity based on the execution mode of said regeneration control, and
said controller is programmed to set the execution mode of said regeneration control so that said second specified remaining quantity becomes equal to or smaller than the remaining fuel quantity at the time at which the controller predicts that said regeneration control will be executed when the remaining fuel quantity is equal to or smaller than said first specified remaining quantity.

5. An exhaust gas purification apparatus regeneration system of an internal combustion engine according to claim 3, wherein when said regeneration fuel quantity estimated by said controller is to be made smaller, said controller is programmed to change said regeneration start condition to thereby set the execution start time of said regeneration control to an earlier time.

6. An exhaust gas purification apparatus regeneration system of an internal combustion engine according to claim 3, wherein when said regeneration fuel quantity estimated by said controller is to be made smaller, said controller is programmed to change a regeneration termination condition as a condition for terminating said regeneration control after the start of execution of said regeneration control to thereby set the execution termination time of said regeneration control to an earlier time.

7. An exhaust gas purification apparatus regeneration system of an internal combustion engine according to claim 3, wherein:
said regeneration control is to raise the temperature of said exhaust gas purification apparatus to a target temperature by supplying fuel to said exhaust gas purification apparatus, and
when said regeneration fuel quantity estimated by said controller is to be made smaller, said controller is programmed to set said target temperature to a higher temperature.

8. An exhaust gas purification apparatus regeneration system of an internal combustion engine according to claim 2, wherein:
said controller is programmed to estimate said regeneration fuel quantity based on an operation state of said internal combustion engine before execution of said regeneration control, and
when the controller determines, while warning is given by said warning apparatus and said execution control is being executed, that the quantity of fuel required for said regeneration control is larger than said regeneration fuel quantity estimated by said controller, execution of said regeneration control is stopped at the time when fuel of said regeneration fuel quantity estimated by said controller is consumed.

9. An exhaust gas purification apparatus regeneration system of an internal combustion engine according to claim 4, wherein when said regeneration fuel quantity estimated by said controller is to be made smaller, said controller is programmed to change said regeneration start condition to thereby set the execution start time of said regeneration control to an earlier time.

10. An exhaust gas purification apparatus regeneration system of an internal combustion engine according to claim 4, wherein when said regeneration fuel quantity estimated by said controller is to be made smaller, said controller is programmed to change a regeneration termination condition as a condition for terminating said regeneration control after the start of execution of said regeneration control to thereby set the execution termination time of said regeneration control to an earlier time.

11. An exhaust gas purification apparatus regeneration system of an internal combustion engine according to claim 4, wherein:
said regeneration control is to raise the temperature of said exhaust gas purification apparatus to a target temperature by supplying fuel to said exhaust gas purification apparatus, and
when said regeneration fuel quantity estimated by said controller is to be made smaller, said controller is programmed to set said target temperature to a higher temperature.

* * * * *